(12) United States Patent
Lecomte et al.

(10) Patent No.: US 7,925,012 B2
(45) Date of Patent: Apr. 12, 2011

(54) METHOD AND SYSTEM FOR THE SECURE DISTRIBUTION OF COMPRESSED DIGITAL TEXTS

(75) Inventors: Daniel Lecomte, Paris (FR); Jérôme Caporossi, Bourg-la-Reine (FR); Daniela Parayre-Mitzova, Paris (FR)

(73) Assignee: Querell Data Limited Liability Company, Dover, DE (US)

( * ) Notice: Subject to any disclaimer, the term of this patent is extended or adjusted under 35 U.S.C. 154(b) by 918 days.

(21) Appl. No.: 10/591,832

(22) PCT Filed: Mar. 8, 2005

(86) PCT No.: PCT/FR2005/000553
§ 371 (c)(1),
(2), (4) Date: Nov. 30, 2006

(87) PCT Pub. No.: WO2005/088902
PCT Pub. Date: Sep. 22, 2005

(65) Prior Publication Data
US 2007/0195953 A1 Aug. 23, 2007

(30) Foreign Application Priority Data
Mar. 8, 2004 (FR) .................................... 04 50463

(51) Int. Cl.
*H04L 9/00* (2006.01)
*G06F 11/30* (2006.01)
(52) U.S. Cl. ............ 380/42; 380/28; 380/217; 713/150; 713/151; 713/152; 713/153; 713/189
(58) Field of Classification Search ...................... 380/42
See application file for complete search history.

(56) References Cited

U.S. PATENT DOCUMENTS

| | | | | |
|---|---|---|---|---|
| 4,730,348 A | * | 3/1988 | MacCrisken | 375/240 |
| 5,861,827 A | * | 1/1999 | Welch et al. | 341/51 |
| 6,829,390 B2 | * | 12/2004 | Bucher et al. | 382/232 |
| 2003/0138104 A1 | | 7/2003 | Marks | |
| 2004/0076299 A1 | | 4/2004 | Wang | |
| 2004/0148356 A1 | * | 7/2004 | Bishop et al. | 709/206 |

FOREIGN PATENT DOCUMENTS

| EP | 0 793 366 A2 | 9/1997 |
|---|---|---|
| EP | 0 851 627 A1 | 7/1998 |
| WO | WO 98/05142 A1 | 2/1998 |

OTHER PUBLICATIONS

Chung-Ping Wu et al., "Efficient Multimedia Encryption via Entropy Codec Design," Proceedings of SPIE, vol. 4314, Jan. 22, 2001, pp. 131-132.

* cited by examiner

*Primary Examiner* — Longbit Chai
(74) *Attorney, Agent, or Firm* — Connolly Bove Lodge & Hutz LLP

(57) ABSTRACT

A process for the secure distribution of compressed digital texts formed by blocks of binary data stemming from digital transformations applied to an original text, and including two stages: a preparatory stage including modifying at least one binary data in one of the blocks according to at least one substitution operation including extraction of the binary data in a block and its replacement by a decoy, and a transmission stage of a modified compressed digital text in conformity with the format of the original text, constituted of blocks modified during the course of the preparatory stage, and by a separate path of the modified compressed digital text, of digital complementary information permitting reconstitution of the original compressed digital text on the equipment of the addressee from the modified compressed digital text and from the complementary information.

37 Claims, 1 Drawing Sheet

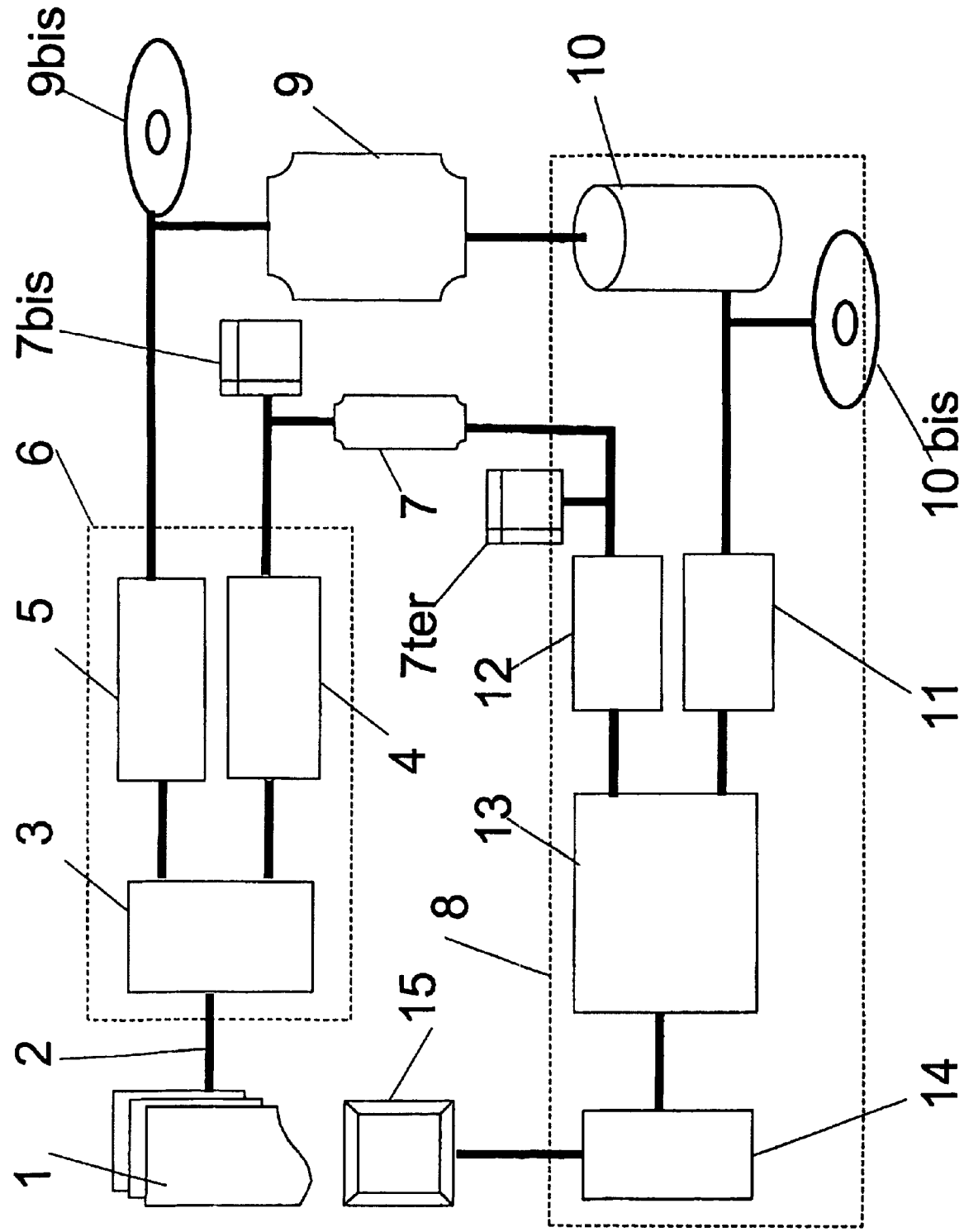

METHOD AND SYSTEM FOR THE SECURE DISTRIBUTION OF COMPRESSED DIGITAL TEXTS

RELATED APPLICATION

This is a §371 of International Application No. PCT/FR2005/000553, with an international filing date of Mar. 8, 2005 (WO 2005/088902, published Sep. 22, 2005), which is based on French Patent Application No. 04/50463, filed Mar. 8, 2004.

TECHNICAL FIELD

This disclosure relates to the area of binary data from transformations applied to digital texts.

BACKGROUND

It is possible with the current solutions to transmit voluminous texts and documents in digital form via telecommunication networks of the cable, DSL (Digital Subscriber Line) or BLR (Local Radio Loop) type. Furthermore, to avoid the pirating of works and confidential documents broadcast in this manner, the latter are frequently encrypted or scrambled by various well known means.

As concerns the secure distribution of texts and binary data, WO 98/05142 discloses a process and equipment for the protection of data and their secure transmission through an electronic network. The document concerns the encryption of textual data with the aid of matrices of ASCII characters generated by keys. The three key elements at the input are a PIN code (Personal Identification Number), the number of the bank account of the user and a password. These three keys initiate the generation of a matrix A and a matrix B. Matrices A and B are generated in a pseudorandom manner with the aid of an analytic function such as a logarithmic function, a trigonometric function, a square root function or the like. The distribution of characters in matrices A and B is irregular and each character is unique. Three integrity control values are calculated and incorporated in the protected stream, one of which represents the sum of the input textual data and the two others are relative to the three input key elements. The input data is transformed into a decimal value with four numbers by operations of permutation, addition, subtraction, multiplication, division and they are then divided into two values of two numbers. These two values are indexed relative to the elements of matrices A and B to form the stream of protected data. However, due to the division into two parts for the indexation, the size of the protected stream increases considerably relative to the size of the initial data. Moreover, all the protected data, as well as the three control values generated, are present in the protected data. Therefore, WO '142 does not correspond to the criteria of high security.

SUMMARY

This disclosure relates a process for secure distribution of compressed digital texts formed by blocks of binary data stemming from digital transformations applied to an original text including modifying at least one binary data in one of the blocks according to at least one substitution operation including extracting the binary data in a block and replacing it with a decoy, transmitting a modified compressed digital text in conformity with a format of the original compressed digital text including modified blocks, transmitting by a separate path the modified compressed digital text and digital complementary information, and reconstituting the original compressed digital text by a calculation on equipment of an addresses as a function of the modified compressed digital text and of the complementary information.

This disclosure also relates a system for implementing the process for secure distribution of compressed digital texts including at least one server containing original compressed digital texts, an apparatus for analyzing the compressed digital text, an apparatus for separating the original compressed digital text into a modified compressed digital text and into complementary information as a function of the analysis, at least one telecommunication network for transmitting, and at least one apparatus in equipment of an addressee for recomposition of the original compressed digital text as a function of the modified compressed digital text and the complementary information.

BRIEF DESCRIPTION OF THE DRAWING

The disclosure will be better understood with the aid of the description, given below purely be way of explanation, of one aspect of the system with reference made to attached FIG. 1, that illustrates a particular aspect of the system permitting the protection and distribution in a secure manner of compressed digital texts.

DETAILED DESCRIPTION

We supply a system that permits the protection and the distribution in a secure manner of compressed digital texts and the restitution of the original digital text while preventing a non-authorized use of or access to these compressed digital texts.

The term "text" defines a succession of characters from an alphabet of letters or numbers and of punctuation signs.

The term "digital text" defines the succession of bytes representing characters from an alphabet and/or punctuation signs and/or data for formatting and displaying a text on a viewing screen.

The term "compressed digital text" defines the binary data stream from an algorithm of statistical compression applied to the digital text.

The action of displaying a compressed digital text is defined as the series of operations including reading and decoding the succession of binary data that constitutes the compressed digital text for restituting the text on a viewing screen such that it can be read and understood from a semantic viewpoint by a human being.

In particular, we provide an apparatus capable of transmitting in a secure manner a set of compressed digital texts to a viewing screen and/or for being recorded on the hard disk of a computer or on the recording support of a box connecting the telecommunication network to a viewing screen such as a television screen or a personal computer monitor while avoiding any fraudulent use such as the possibility of making illicit copies of textual contents or of compressed digital texts. The invention also relates to a client-server system between the server that furnishes the secure compressed digital texts and the client that displays, reads, records or prints the compressed digital texts.

The protection of compressed digital texts is based on the principle of deletion and replacement of certain information coding the original compressed digital texts by any method, e.g., substitution, modification, permutation or shifting of the information. This protection is also based on a knowledge of the structure of the binary data at the output of the encoder producing the compressed digital texts.

We address the general principle of a process for securing compressed digital texts. The solution includes extracting and permanently preserving, in a location that cannot be accessed by the user, in fact, in the distribution network, a part of the compressed digital text recorded at the client's or sent online, which part is of prime importance for exploiting the compressed digital text on a display screen, but has a very low volume relative to the total volume of the compressed digital text recorded at the user's or received online. The lacking part will be transmitted via the distribution network at the moment of the exploitation of the compressed digital text.

As the compressed digital text is separated into two non-equal parts, the larger part of the compressed digital text is called the "modified compressed digital text" and is therefore transmitted via a classic broadband or narrowband broadcasting network whereas the lacking part called the "complementary information" is sent on demand via a narrowband telecommunication network such as the classic telephone networks or cellular networks of the GSM, GPRS, or UMTS type or by using a small part of a network of the DSL or BLR type, or by using a subset of the bandwidth shared on a cable network, or also via a physical support such as a memory card or any other support. The two networks can advantageously be combined while retaining the two separate transmission paths. The original compressed digital text is reconstituted on the equipment of the addressee by a synthesis module from the modified compressed digital text and the complementary information.

To implement the process, we provide a protection system comprising an analysis and protection module and a recomposition module that are based on a digital format stemming from the encoding of a digital text using statistical compression algorithms. The analysis and protection module is based on the substitution by "decoys" or on the modification of part of the binary data composing the original compressed digital text. The fact of having removed and substituted a part of the original data of the original compressed digital text during the generation of the modified compressed digital text does not permit the recomposition of the original compressed digital text from only the data of the modified compressed digital text.

Based on the characteristics of the compressed digital text, several variants of the protection process are implemented and illustrated with selected examples.

We more particularly provide an apparatus capable of transmitting in a secure manner a digital text to a display device and/or for being recorded in the memory of the backup apparatus of a box connecting the telecommunication network to the display device while preserving the semantic content of the text, but avoiding the possibility that the digital text could be read and copied illicitly.

A compressed digital text generated by a statistical compression algorithm from a digital text is constituted of a succession of binary data representing codes and or entries in coding tables and/or pointers to the positions in the digital text.

The process includes, after analysis of the compressed digital text, extracting at least one original binary data in the compressed digital text, which original binary data represents a code or an entry in a coding table or a pointer, which data is randomly selected, and in replacing it by a binary data called a decoy of the same size and of the same nature, but with a random value to generate a compressed digital text in conformity with the format of the original compressed digital text. The displaying of the modified compressed digital text then restores a text that is illegible and/or incomprehensible from a semantic viewpoint for a human being.

The original binary data to be extracted may be selected in a deterministic manner.

The value of the decoy binary data may be calculated in a deterministic manner.

The decoy binary data may have a size different from the size of the original binary data.

The process thus relates to the secure distribution of compressed digital texts formed by blocks of binary data stemming from digital transformations of applied to an original text, characterized in that it comprises:
- a preparatory stage including modifying at least one binary data in one of the blocks according to at least one substitution operation including extraction of the binary data in a block and its replacement by a decoy,
- a transmission stage:
  i. of a modified compressed digital text in conformity with the format of the original compressed digital text, constituted of blocks modified during the course of the preparatory stage, and
  ii. by a separate path of the modified compressed digital text, of digital complementary information permitting reconstitution of the original compressed digital text from the calculation on the equipment of the addressee as a function of the modified compressed digital text and the complementary information.

The binary data may represent an entry into a coding table and the decoy represents a different entry into the coding table.

The coding table may be constructed in a dynamic manner during the decoding.

The coding table is advantageously predefined by a given standard or a given norm.

The binary data advantageously represents a prior position in the digital text generated in the course of the decoding and the decoy represents a different prior position in the digital text generated in the course of the decoding.

The modified compressed digital text 5 may be in conformity with the standard of the original compressed digital text 1.

The modified compressed digital text 5 may be in conformity with the format of the original compressed digital text 1.

The binary data and the decoy may have the same size.

The binary data and the decoy may have different sizes.

The series of binary data is preferably coded differentially.

The modified compressed digital text may have the same size as the original compressed digital text.

The modified compressed digital text may have a size different than that of the original compressed digital text.

The compressed digital text reconstituted from the modified compressed digital text is preferably strictly identical to the original compressed digital text.

The process is advantageously applied to compressed digital texts stemming from the LZW compression format.

The process is advantageously applied to compressed digital texts stemming from the ZLIB/DEFLATE compression format.

The process is advantageously applied to compressed digital texts stemming from the Adobe PDF format.

The process is advantageously applied to compressed digital images stemming from the TIFF format.

The process is advantageously applied to compressed digital images stemming from the GIF format.

We also provide a system for implementing the process, comprising at least one server containing original compressed digital texts and comprising an apparatus for analyzing the compressed digital text, an apparatus for separating the original compressed digital text into a modified compressed digital text and into complementary information as a function of the analysis, at least one telecommunication network for the transmission and at least one apparatus in the equipment of the addressee for the recomposition of the original compressed digital text as a function of the modified compressed digital text and the complementary information.

The systems and processes will be better understood with the aid of the following examples concerning statistical compression algorithms of digital texts well known in the art.

The LZW (Lempel-Ziv-Welch) compression algorithm is a statistical compression algorithm that can be adapted to a variable length and that has been adapted in particular as a compression standard in the TIFF (Tag Image File Format), GIF (Graphics Interchange Format) or Adobe PDF (Portable Document Format) standards. The LZW algorithm also compresses binary data (byte stream) as well as visual data (pixel stream) or also the data of a digital text.

The data stemming from the LZW compression algorithm includes a sequence of codes that have a length comprised between 9 and 12 bits. Each code represents either a simple character (that is, a byte comprised between 0 and 255), a table re-initialization marker (value 256), an "end of data" marker (value 257) or also an entry into a table (value>258), which entry is associated with a sequence of bytes found previously in the digital text to be compressed. Initially and in the encoding as well as in the decoding the codes have a length of 9 bits (value comprised between 0 and 257) and the table is initialized with the 258 first entries (the 256 values of a byte+the re-initialization marker 256+the end of data marker 257).

As the encoding (or decoding) process progresses, new codes are added to the table, each associated with sequences of bytes with variable lengths that can appear in a recurrent manner in the digital text to be compressed (or decompressed). Each time that a byte sequence that has already appeared reappears in the digital text the code corresponding to the entry of the table storing this same sequence is sent to the compressed digital text. Likewise, during decompression, the codes are systematically replaced by the byte sequence read at the corresponding entry of the table and a new entry is added to the table to store the sequence formed from the previously decoded sequence. Thus, the table is constructed dynamically in the same manner in the encoding as in the decoding.

When the binary length of the codes is no longer sufficient for representing an entry in the table, it is increased by 1: Thus, as soon as the number of entries in the table reaches 510, the codes are coded on 10 bits (and in the same manner when the entry number reaches 1022 (11 bits) and 2046 (12 bits). However, the codes never exceed a length of 12 bits (4095 entries maximum). In a compressed digital text the code 256 can appear several times: The table is then reinitialized and the binary length of the codes re-initialized to 9.

During the protection operation of a compressed digital text stemming from the LZW algorithm, an algorithm reads the byte stream and dynamically constructs the table in the same manner as an LZW decompression algorithm.

The protection operation of an LZW compressed digital text includes extracting in a random and/or deterministic manner in the sequence one or several (this number is determined in a random or calculated manner) original codes and in replacing them by one or several valid "decoy" codes, which valid "decoy" codes point to entries in the table. A "decoy" code is called valid when the new pointed entry in the table exists and then the entry corresponds to a sequence of bytes with a length identical to that pointed by the original code.

The digital text decompressed from the modified compressed digital text has the same size as the original digital text. The text displayed from the modified compressed digital text includes a random succession of alphabetical characters and punctuation signs that is not intelligible to a human being.

The Adobe PDF (Portable Document Format) format uses the LZW statistical compression algorithm for compressing objects of the digital text type in a document encoded in the PDF format. An object of the digital text type represents a paragraph, one or several pages of text, the legend of a figure. Each object of the digital text typed is coded in an independent manner. Thus, the process allows the protection of certain digital texts to render the displayed text illegible and/or incomprehensible while leaving other texts objects in the same PDF document readable and comprehensible.

The process permits the protection of objects of the figure and digital image type incorporated in a text document and stemming from a statistical compression algorithm by making them incoherent from the viewpoint of human visual perception while leaving text objects in the same PDF document readable and comprehensible.

The process advantageously permits the protection of digital images in the TIFF and GIF formats by making them incoherent from the viewpoint of human visual perception.

The zlib/deflate compression algorithm is a combination of two statistical compression algorithms: Huffman and LZ77 (Lempel-Ziv 77). It is used especially for compressing objects of the digital text and/or digital image and/or figure type in the Adobe PDF format.

The Huffman algorithm includes replacing a succession of symbols in an original stream and stemming from a certain alphabet by a series of codes with variable lengths, each code substituting a symbol in the compressed stream. The algorithm begins by analyzing the number and frequency of the symbols appearing in the original stream to construct a coding tree from which it associates each encountered symbol with a code with a length inversely proportional to the frequency of the appearance of the symbol in the original stream. The compression then replaces each symbol with its associated code. However, the decompression algorithm needs the coding tree to decompress the compressed stream. However, a modified version of Huffman is used for the zlib/deflate algorithm: The coding tree is constructed respecting the supplementary rules that confer a property of unicity to it and the decompression algorithm no longer needs the coding tree, but only the lengths of the codes used to reconstruct the latter.

Algorithm LZ77 identifiers the sequences of recurrent data in a stream in a sliding window of fixed size. When a sequence that has already appeared is detected again, it is replaced in the compressed stream by two numbers: A distance d and a length l. The distance indicates at which location in the window the same sequence begins and the length indicates how much data the identified sequence comprises. During the decompression, each time the algorithm encounters a couple (d, l) it recopies in the exiting stream the sequence of data with length l read from the current position less d.

The zlib/deflate compression algorithm uses three compression modes: A "no compression" mode for the data that has already been compressed, a classic LZ77+Huffman mode with the coding trees defined in the specifications of the algorithm, and a modified LZ77+Huffman mode. The data is cut into blocks with each block being coded independently according to one of the three previously cited modes.

In modes 2 and 3 the data is first coded according to LZ77 and a sequence of symbols is thus generated, which symbols are of the "character" (i.e., a byte whose value is comprised between 0 and 255) type or distance-length (d, l) couple type.

This symbol sequence is then compressed with a classic Huffman algorithm (mode 2) or a modified Huffman (mode 3).

The operation for protecting a compressed digital text according to the zlib/deflate algorithm includes modifying one or several blocks coded according to modes 2 or 3. The modifications include extracting from the compressed digital text a Huffman code coding a symbol of the "character" or distance d type and replacing it with a valid Huffman code. A Huffman code is called valid if it has the same length as the code that it replaces and if it corresponds effectively to a coded symbol of the same type, that is, character or distance.

A modified zlib/deflate compressed digital text has the same size as the original zlib/deflate compressed digital text. Likewise, the decompressed digital text from the modified compressed digital text has the same size as the original digital text.

Displaying the modified digital text produces a text that is illegible and/or incomprehensible for a human being because it displays a succession of characters and punctuation signs with no logic.

The specifications of the zlib format define a field of 4 bytes ADLER32 located at the end of the compressed digital texts: This field stores a unique identifier of the original digital text and it is used during the decompression to verify the integrity of the digital text. In the case of a compressed and modified zlib/deflate digital text, the signature of the decompressed digital text will not be identical to that of the original digital text.

The original signature is advantageously updated during the application of the protection.

Turning now to FIG. 1, compressed digital text 1 to be secured is passed via link 2 to analysis and protection module 3 that generates a modified compressed digital text 5 in a format identical to original compressed digital text 1 except that certain binary data have been replaced by values different than the original ones, and is stored in server 6. The complementary information 4 of any format is also placed in server 6 and contains information relative to the data of the compressed digital text that was modified, replaced, substituted or shifted, and to its values or emplacements in the original compressed digital text.

Protected compressed digital text 5 in a format identical to the original compressed digital text is advantageously then transmitted via a high throughput network 9 of the microwave, cable, satellite type or another network to the terminal of the user 8 and more precisely into a memory 10.

When user 8 requests to display text present in memory 10, two possibilities are possible: Either user 8 does not have all the rights necessary to exploit the compressed digital text, in which case the modified compressed digital text 5 generated by protection module 3 and present in memory 10 is passed to synthesis system 13 via reading buffer memory 11, that does not modify it and transmits it identically to a display device capable of decoding it 14 and its contents, degraded by protection module 3 and incomprehensible from a semantic viewpoint, and is displayed on viewing screen 15. Modified compressed digital text 5 generated by protection module 3 is advantageously passed directly via network 9 to reading buffer memory 11 then to synthesis module 13.

Or, server 6 decides that user 8 has the rights to correctly display the compressed digital text. In that case, synthesis module 13 makes a display request to server 6 containing complementary information 4 necessary for the recomposition of the original compressed digital text 1. Server 6 then sends complementary information 4 via telecommunication network 7 of the analog or digital telephone line type, DSL (Digital Subscriber Line) or BLR (Loop Local Radio) type, via DAB networks (Digital Audio Broadcasting) or via digital mobile telecommunication networks (GSM, GPRS, UMTS) 7, which complementary information permits the reconstitution of the compressed digital text in such a manner that user 8 can store it in buffer memory 12. Synthesis module 13 then proceeds to the reconstitution of the original compressed digital text from the modified compressed digital text that it reads in its reading buffer memory 11, and modified fields, whose positions it knows, as well as the original values are restored by virtue of the content of the complementary information read in recomposition buffer memory 12. Complementary information 4 that is sent to the recomposition module is specific for each user and is a function of his rights, e.g., single or multiple use, the right to make one or several private copies, late or early payment.

Modified compressed digital text 5 is passed directly via network 9 to reading buffer memory 11 then to synthesis module 13.

Modified compressed digital text 5 is advantageously recorded on a physical support like a disk of the CD-ROM or DVD type, a hard disk or a flash memory card. Modified compressed digital text 5 is then read from physical support 9bis by disk reader 10bis of box 8 in order to be transmitted to reading buffer memory 11, then to recomposition module 13.

Complementary information 4 is advantageously recorded on a physical support 7bis with a credit card format constituted of a smart card or a flash memory card. This card 7bis is then read by module 12 of the apparatus 8 comprising a card reader 7ter.

Card 7bis advantageously contains the applications and the algorithms that will be executed by recomposition module 13.

Apparatus 8 is advantageously an autonomous, portable and mobile apparatus.

The invention claimed is:

1. A process for secure distribution of compressed digital texts formed by blocks of binary data stemming from digital transformations applied to an original text, comprising:
    configuring at least one processor device to perform functions of:
    modifying at least one instance of binary data randomly selected in at least one of the blocks according to at least one substitution operation comprising extracting the binary data to be modified and replacing it with at least one decoy to provide at least one modified block, wherein the binary data to be modified is indicative of a reference to at least a first other instance of the binary data and the decoy is indicative of a reference to at least a second other instance of the binary data different than the at least one first other instance of the binary data;
    storing the at least one modified block in a memory;
    transmitting a modified compressed digital text in conformity with a format of the original compressed digital text, the modified compressed digital text comprising the stored at least one modified block; and
    transmitting, by a separate path from the transmission of the modified compressed digital text, digital complementary information;
    wherein, the transmitting enables the original compressed digital text to be reconstituted by a calculation on equipment of an addressee as a function of the modified compressed digital text and the complementary information.

2. The process according to claim 1, wherein the modifying at least one instance of the binary data comprises modifying data indicative of an entry into a coding table with data indicative of a different entry into the coding table.

3. The process according to claim 1, wherein modifying at least one instance of the binary data includes modifying binary data with a decoy that has the same size.

4. The process according to claim 1, wherein modifying at least one instance of the binary data includes modifying binary data with a decoy that have different sizes.

5. The process according to claim 1, further comprising coding the binary data differentially.

6. The process according to claim 1, wherein transmitting a modified compressed digital text includes transmitting a modified compressed digital text that is in conformity with a standard applicable to the original compressed digital text.

7. The process according to claim 1, wherein transmitting a modified compressed digital text includes transmitting a modified compressed digital text that is in conformity with a format applicable to the original compressed digital text.

8. The process according to claim 1, wherein transmitting a modified compressed digital text includes transmitting a modified compressed digital text that has the same size as the original compressed digital text.

9. The process according to claim 1, wherein transmitting a modified compressed digital text includes transmitting a modified compressed digital text that has a size different from the original compressed digital text.

10. The process according to claim 1, applied to compressed digital texts stemming from an Lempel-Ziv-Welch compression format.

11. The process according to claim 1, applied to compressed digital texts stemming from a ZLIB/DEFLATE compression format.

12. The process according to claim 1, applied to compressed digital texts stemming from a Portable Document Format format.

13. The process according to claim 1, applied to compressed digital images stemming from a Tagged Image File Format format.

14. The process according to claim 1, applied to compressed digital images stemming from a Graphics Interchange Format format.

15. A process for secure distribution of compressed digital texts formed by blocks of binary data stemming from digital transformations applied to original texts, comprising:
configuring at least one processor device to perform the functions of:
receiving, by separate paths, a modified compressed digital text and a digital complimentary information respectively:
the modified compressed digital text having at least at least one instance of binary data randomly selected in at least one of the blocks replaced with at least one decoy, the binary data that was replaced being indicative of a reference to at least a first other instance of the binary data and the decoy being indicative of a reference to at least a second other instance of the binary data different than the at least one first other instance of the binary data, and
the digital complementary information; and
reconstituting an original compressed digital text by a calculation on equipment of an addressee as a function of the modified compressed digital text and the complementary information.

16. The process according to claim 15, further comprising constructing the coding table in a dynamic manner during reconstituting.

17. The process according to claim 16, wherein constructing the coding table includes constructing a coding table that is predefined by a given standard or a given norm.

18. The process according to claim 15, wherein the reconstituting includes modifying the decoy that represents a prior position in the digital text with binary data that represents a different prior position in the digital text.

19. The process according to claim 15, wherein compressed digital text reconstituted from the modified compressed digital text is identical to the original compressed digital text.

20. A system for securely distributing an original compressed digital media comprising blocks of data stemming from digital transformations applied to at least one original work, the system comprising:
means for replacing at least one instance of the data in at least one of the blocks with at least one substitute to provide at least one modified block, wherein the data to be replaced is indicative of a reference to at least a first other instance of the data in at least one of the blocks and the substitute is indicative of a reference to at least a second other instance of the data in at least one of the blocks different than the at least one first one other instance of the data;
means for transmitting a modified compressed digital media, the modified compressed digital media being in conformity with a format of the original compressed digital media and comprising the at least one modified block; and
means for transmitting, by a separate path from the modified compressed digital media, complementary information, wherein the complementary information is suitable for use with the modified compressed digital media to reproduce the original compressed digital media.

21. The system according to claim 20, wherein the means for replacing at least one instance of the data comprises means for replacing data indicative of an entry into a coding table with data indicative of a different entry into the coding table.

22. The system according to claim 20, wherein the means for replacing at least one instance of the data includes means for replacing data with a decoy that has the same size.

23. The system according to claim 20, wherein the means for replacing at least one instance of the data includes means for replacing data with a decoy that have different sizes.

24. The system according to claim 20, further comprising means for coding the data differentially.

25. The system according to claim 20, wherein the means for transmitting a modified compressed digital text includes means for transmitting a modified compressed digital text that is in conformity with a standard applicable to the original compressed digital text.

26. The system according to claim 20, wherein the means for transmitting a modified compressed digital text includes means for transmitting a modified compressed digital text that is in conformity with a format applicable to the original compressed digital text.

27. The system according to claim 20, wherein the means for transmitting a modified compressed digital text includes means for transmitting a modified compressed digital text that has the same size as the original compressed digital text.

28. The system according to claim 20, wherein the means for transmitting a modified compressed digital text includes means for transmitting a modified compressed digital text that has a size different from the original compressed digital text.

29. A non-transitory computer-readable storage medium having instructions stored thereon, which in response to execution by a processor, results in a machine performing the operations of:

replacing at least one instance of the data in at least one of the blocks with at least one substitute to provide at least one modified block, wherein the data to be replaced is indicative of a reference to at least a first other instance of the data in at least one of the blocks and the substitute is indicative of a reference to at least a second other instance of the data in at least one of the blocks different than the at least one first one other instance of the data;

transmitting a modified compressed digital media, the modified compressed digital media being in conformity with a format of the original compressed digital media and comprising the at least one modified block; and transmitting, by a separate path from the modified compressed digital media, complementary information, wherein the complementary information is suitable for use with the modified compressed digital media to reproduce the original compressed digital media.

30. The computer-readable medium of claim 29, wherein the instructions for replacing at least one instance of the data comprise instructions for replacing data indicative of an entry into a coding table with data indicative of a different entry into the coding table.

31. The computer-readable medium of claim 29, wherein the instructions for replacing at least one instance of the data include instructions for replacing data with a decoy that has the same size.

32. The computer-readable medium of claim 29, wherein the instructions for replacing at least one instance of the binary data include instructions for replacing binary data with a decoy that have different sizes.

33. The computer-readable medium of claim 29, further comprising instructions for coding the data differentially.

34. The computer-readable medium of claim 29, wherein the instructions for transmitting a modified compressed digital text include instructions for transmitting a modified compressed digital text that is in conformity with a standard applicable to the original compressed digital text.

35. The computer-readable medium of claim 29, wherein the instructions for transmitting a modified compressed digital text include instructions for transmitting a modified compressed digital text that is in conformity with a format applicable to the original compressed digital text.

36. The computer-readable medium of claim 29, wherein the instructions for transmitting a modified compressed digital text include instructions for transmitting a modified compressed digital text that has the same size as the original compressed digital text.

37. The computer-readable medium of claim 29, wherein the instructions for transmitting a modified compressed digital text include instructions for transmitting a modified compressed digital text that has a size different from the original compressed digital text.

* * * * *

UNITED STATES PATENT AND TRADEMARK OFFICE
CERTIFICATE OF CORRECTION

| | | |
|---|---|---|
| PATENT NO. | : 7,925,012 B2 | Page 1 of 1 |
| APPLICATION NO. | : 10/591832 | |
| DATED | : April 12, 2011 | |
| INVENTOR(S) | : Lecomte et al. | |

It is certified that error appears in the above-identified patent and that said Letters Patent is hereby corrected as shown below:

Column 9, lines 48-49, in Claim 15, delete "at least at least" and insert -- at least --.

Signed and Sealed this
Sixteenth Day of August, 2011

David J. Kappos
*Director of the United States Patent and Trademark Office*